United States Patent [19]

Takizawa et al.

[11] 4,240,817
[45] Dec. 23, 1980

[54] UREA RESIN FOAM MAT

[75] Inventors: Iwao Takizawa, Shiraoka; Iwao Otsubo, Tokyo; Toru Shimizu, Shiraoka, all of Japan

[73] Assignee: Nissan Chemical Industries, Ltd., Tokyo, Japan

[21] Appl. No.: 751,198

[22] Filed: Dec. 16, 1976

[30] Foreign Application Priority Data

Dec. 27, 1975 [JP] Japan .............................. 50/156504

[51] Int. Cl.$^3$ .............................................. C05C 9/00
[52] U.S. Cl. ............................................ 71/29; 71/30; 71/64 A; 71/64 SC; 71/64 DC; 71/27

[58] Field of Search .................................. 71/1, 27–30, 71/64 R, 64 A, 64 SC, 64 DC

[56] References Cited

U.S. PATENT DOCUMENTS 3,231,363   1/1966   Renner .............................. 71/28 X Primary Examiner—Ferris H. Lander
Attorney, Agent, or Firm—Brisebois & Kruger

[57] ABSTRACT

A water absorbable urea resin foam mat which contains alkylene glycols and inorganic salts, and which is effective for raising seedling of crops.

6 Claims, No Drawings

UREA RESIN FOAM MAT

BACKGROUND OF THE INVENTION

Urea resin foam has been used for various applications and recently its utilization for rice-seedling raising mats is increasing. For this purpose good water absorption is especially required. Since the introduction of rice planting machines has effectively mechanized transplantation of paddy rice and reduced the labor, this way of transplantation is increasingly adopted year by year, accounting for half of the total cultivation area of paddy rice in Japan, i.e. about a half of 2.7 million ha, in 1975.

In order to secure paddy rice seedling to be used for mechanized transplantation, an enormous amount of soil is needed. Moreover, various adjustments are required for such soil to be used for raising seedling, and considerable time and labor are spent. For this reason, artificial cultivation soil which can be easily handed without any adjustment tends to be increasingly employed year by year.

Artificial cultivation soil which is light and very easily applicable requires the following properties:
(1) good water absorption
(2) good water retention
(3) easy intrusion of plant roots
(4) pH of the soil ranging from 4 to 7
(5) soil easily crushed with rake of the rice planting machine Urea resin foam has already properties (2), (3) and (5), and its pH can be easily adjusted to within the range of 4~7. However, providing water absorption has been a most important problem to be solved, because high water repellency is a property inherent to urea resin foam.

SUMMARY OF THE INVENTION

The present invention relates to an improvement of artificial cultivation soil for raising seedling of crops to be planted with planting machine.

DETAILED EXPLANATION OF THE INVENTION

As a result of intensive study to provide urea resin foam mats with water absorbability, the present inventors have successfully solved the above mentioned problem.

The urea resin foam mat of the present invention is characterized by containing alkylene glycols and inorganic salts.

The urea resin foam mat of the present invention represents a foam consisting of urea-formaldehyde resin, which may be manufactured by any process. The bulk density of the foam ranges from 0.005 to 0.03, with variety shapes of mat depending on the use and the size is not particularly limited. For example, it is preferable to use a mat having a size of 580 mm×280 mm×18 mm for raising seedling of paddy rice. It is preferable to use a mat which rapidly absorbs about 1~2.5 l of water for raising seedling of crops.

The urea resin foam mat having good water absorbability of the present invention can be naturally used for raising flowers, vegetables, lawn and trees in addition to paddy rice.

In the present invention, one or more kinds of alkylene glycols are employed, such as ethylene glycol, triethylene glycol, polyethylene glycol and polypropylene glycol, and the amount is preferably 0.1~50 g per a sheet of mat, in particular 1~10 g. The alkylene glycol content of less than 0.1 g per mat lowers water absorption, while the content higher than 50 g is unfavourable because of danger of causing phytotoxity against crops.

Inorganic salts, such as chlorides, nitrates, sulfates carbonates, phosphates, and hydroxides of alkali metal, alkali earth metal and ammonium may be used. For example, ammonium chloride, ammonium nitrate, ammonium sulfate, ammonium hydroxide, ammonium carbonate, ammonium primary phosphate, ammonium secondary phosphate, potassium chlorate, potassium nitrate, potassium sulfate, sodium hydrogenphosphate, calcium hydrogenphosphate and calcium monohydrogenphosphate can be designated and one or more kinds of such salts may be selected. The content of the inorganic salt in the mat is preferably 0.01~100 g, in particular 0.1~10 g. Water absorption of the mat decreases with the content of inorganic salt of lower than 0.01 g per mat. It is unfavourable to use inorganic salts with the content of higher than 100 g per mat, because it causes phytotoxity against crops.

The above mentioned alkylene glycols and inorganic salts can be added to the urea resin foam mat by soaking said urea resin foam mat into an aqueous solution of them for a short period of time.

Namely, in the present invention, water absorbability is enhanced through synergism of alkylene glycol with inorganic salt, when they are contained in the urea resin foam mat. The desired effect can not be attained, when alkylene glycol or inorganic salt are separately added.

In order to concretely explain the present invention, the working examples will be indicated below:

WORKING EXAMPLE 1

A mixture of 50 g of polyethylene glycol and 50 g of an inorganic salt indicated in Table 1 was dissolved in 1 l of water. 50 g of this aqueous solution was uniformly applied on the surface of a urea resin foam mat (300 mm×300 mm×18 mm). Three samples were prepared by drying the treated mat at 80° C. for 30 min and then allowing it to stand at 20° C. for 1 day, 7 days and 14 days, respectively.

The samples thus obtained were cut in a size of 50 mm×50 mm×18 mm and used as test specimens. The water absorption was measured according to the following method.

In a water tank the test specimen was placed onto water surface in such a way that the surface of the specimen treated with the solution of chemicals was in contact with the water surface. The weight of test pieces was measured after they had been allowed to float on the water surface for 120 sec. Amount of water absorbed was calculated by subtracting the weight of test pieces before they had been placed onto water from the weight obtained above.

The result is indicated in Table 1.

TABLE 1

Water absorption of urea resin foam and combination of polyethylene glycols with inorganic salts.

| | Combination of polyethylene glycol with inorganic salt | Amount of water absorbed cc/50 × 50 × 18 mm | | |
|---|---|---|---|---|
| | | 1 day after treatment | 7 days after treatment | 14 days after treatment |
| Working example | Polyethylene glycol + $NH_4NO_3$ | 18.1 | 37.4 | 40.8 |
| | Polyethylene glycol + $K_2HPO_4$ | 18.1 | 21.1 | 21.9 |
| | Polyethylene glycol + $(NH_4)_2CO_3$ | 15.3 | 21.0 | 22.5 |
| | Polyethylene glycol + $NH_4Cl$ | 13.9 | 15.0 | 15.1 |
| | Polyethylene glycol + $(NH_4)_2HPO_4$ | 11.7 | 14.2 | 14.9 |
| | Polyethylene glycol + $NH_4OH$ | 11.3 | 15.3 | 19.5 |
| | Polyethylene glycol + KCl | 10.4 | 14.3 | 17.0 |
| | Polyethylene glycol + $NaH_2PO_4$ | 8.3 | 8.4 | 8.5 |
| | Polyethylene glycol + $(NH_4)_2SO_4$ | 7.8 | 10.0 | 10.8 |
| | Polyethylene glycol + $Na_5P_3O_{10}$ | 7.8 | 10.4 | 10.4 |
| | Polyethylene glycol + $K_2SO_4$ | 7.4 | 8.1 | 8.2 |
| | Polyethylene glycol + $NH_4H_2PO_4$ | 6.5 | 6.6 | 6.6 |
| | Polyethylene glycol + $KNO_3$ | 5.6 | 6.6 | 10.2 |
| | Polyethylene glycol + $Ca(H_2PO_4)_2$ | 5.3 | 8.4 | 8.9 |
| | Polyethylene glycol + $CaHPO_4$ | 4.6 | 6.3 | 6.3 |
| Comparison | Polyethylene glycol* | 3.5 | 3.5 | 3.5 |
| | Untreated | 0.2 | 0.3 | 0.3 |

*(Note) Single use of polyethylene glycol . . . 100 g of polyethylene glycol was dissolved in 1 l of water and 50 g of this solution was applied according to the method in working example.

As is shown in Table 1, water absorption of untreated specimen was very low, while those of the specimens treated with a combination of polyethylene glycol with an inorganic salt of the present invention were higher than that of the specimen treated with polyethylene glycol singly. This is caused by synergism.

WORKING EXAMPLE 2

A mixture of 50 g of ammonium nitrate and 50 g of one of glycols indicated in Table 2 was dissolved in 1 l of water. 50 g of this aqueous solution was uniformly applied on the surface of a urea resin foam mat (300 mm × 300 mm × 18 mm) and a sample was prepared by drying at 50° C. for 30 min and then allowing it to stand at 20° C. for 18 hrs.

The sample thus obtained was cut in pieces having a size of 50 mm × 50 mm × 18 mm to be used. The water absorption was measured according to the method in Example 1, when specimens were allowed to float on the water surface for a time of 5, 10, 30, 60 and 120 sec, resp.

The experimental result is indicated in Table 2.

is higher than those treated with any alkylene glycol singly. This is caused by synergism.

Test Example 1 Test on paddy-rice growing

A test solution composed of the following compounds was uniformly applied on the surface of a urea resin foam mat having a size of 580 mm × 280 mm × 18 mm and the mat was dried at 80° C. for 60 min. The mat of the present invention thus obtained was placed in a box for raising seedling and 2 l of water was sprinkled and thoroughly absorbed into the mat. 200 g of paddy rice seeds (variety: Nihonbare) which have been previously soaked in water to slightly germinate were sowed on them and raised for 21 days after covering them with the diluvial soil.

On the other hand, for the comparison, a similar box as mentioned above was packed with the diluvial soil according to the conventional method and 200 g of paddy rice seeds (variety: Nihonbare) which have been previously soaked in water to slightly germinate were sowed on them and raised for 21 days after covering them with the diluvial soil.

TABLE 2

Water absorption of urea resin foam and combination of ammonium nitrate with glycols

| | Combination of ammonium nitrate with glycols | Amount of water absorbed cc/50 × 50 × 18 mm | | | | |
|---|---|---|---|---|---|---|
| | | Time of floating on the water surface | | | | |
| | | 5 sec | 10 sec | 30 sec | 60 sec | 120 sec |
| Working Example | Ammonium nitrate + ethylene glycol | 6.5 | 7.0 | 7.5 | 8.0 | 9.0 |
| | Ammonium nitrate + triethylene glycol | 10.5 | 12.5 | 14.5 | 15.5 | 16.0 |
| | Ammonium nitrate + polyethylene glycol | 11.0 | 13.0 | 14.5 | 15.5 | 17.0 |
| | Ammonium nitrate + polypropylene glycol | 18.0 | 23.0 | 33.0 | 36.0 | 37.0 |
| Comparison | Ethylene glycol* | 3.1 | 3.1 | 3.1 | 3.1 | 3.1 |
| | Triethylene glycol* | 3.0 | 3.1 | 3.1 | 3.1 | 3.1 |
| | Polyethylene glycol* | 3.5 | 3.5 | 3.5 | 3.5 | 3.5 |
| | Polypropylene glycol* | 11.0 | 16.5 | 21.0 | 22.0 | 24.5 |

*(Note)
In the comparison example, 100g each of ethylene glycol, triethylene glycol, polyethylene glycol and polypropylene glycol was dissolved in 1 l of water and 50 g of the aqueous solution was used according to the method in working example.

As can be seen in Table 2, water absorption of the specimen treated with a combination of ammonium nitrate with an alkylene glycol of the present invention

| Composition of the test solution to be applied on a mat (amount for one sheet of mat) | | |
|---|---|---|
| Polyethylene glycol | 5 g | |
| Ammonium nitrate | 1.72 g | Each nitrogen, |
| Ammonium secondary phosphate | 1.86 g | phosphoric acid and potassium is |
| Potassium chloride | 1.58 g | 1 g as a component. |
| Sodium iron ethylenediamine-tetraacetate* | 0.25 g | |

*It was added as a necessary iron for raising plant. The test solution was prepared by dissolving the above compounds in 50 g of water.

The test was repeated three times and the plant height, root length and the number of unfolded leaves were investigated.

The result is shown in Table 3.

TABLE 3

| | Item | | |
|---|---|---|---|
| Division | Plant height (cm) | Root length (cm) | Number of unfolded leaves (sheet) |
| Division of the present invention | 15.2 | 16.1 | 2.6 |
| Division for comparison | 14.8 | 15.5 | 2.5 |

As is obvious from the result in Table 3, growing of paddy rice on the urea resin foam mat of the present invention is better than that on soil by the conventional method.

Test Example 2 Test on germination of vegetables

A mat prepared by the same procedure as in Test Example 1 was placed in a box for raising seedling and 2 l of water was sprinkled and thoroughly absorbed into the mat. About 400 grains of seeds of the following vegetables were sowed on them and raised for 14 days.

For the comparison, a similar box was packed with the diluvial soil according to the conventional method and about 400 grains of seeds of the following vegetables were sowed on them and raised for 14 days.

Germination ratio was examined on 5 days, 6 days, 7 days and 13 days after seeding. The germination ratio is regarded as a ratio of germinated seed to sowed seed.

Experimental result is indicated in Table 4.

TABLE 4

| Vegetable | Division | 5 days after seeding | 6 days after seeding | 7 days after seeding | 13 days after seeding |
|---|---|---|---|---|---|
| Watermelon | present invention | 32% | 73% | 90% | 90% |
| | comparison | 25 | 71 | 76 | 80 |
| Melon (prince) | present invention | 85 | 94 | 96 | 99 |
| | comparison | 90 | 95 | 95 | 95 |
| Gourd | present invention | 5 | 24 | 60 | 94 |
| | comparison | 0 | 14 | 86 | 100 |
| Pumpkin | present invention | — | — | — | 99 |
| | comparison | — | — | — | 98 |

As can be seen in Table 4, the germination ratio in the test division of the present invention was equivalent to that in the division by the conventional method.

Test Example 3 Test on rooting of grafted plant

Test on rooting of grafted plant was examined with a watermelon grafted on a rootstock of ground and melon (prince) on a rootstock of pumpkin.

Rooting ratio of the above mentioned grafted plants was examined by using the mat of the present invention and the diluvial soil by the conventional method as bed.

The rooting ratio is regarded as ratio of number of grafted plants which grow to number of grafted plants.

The result is indicated in Table 5.

TABLE 5

| | Division | Rooting ratio |
|---|---|---|
| Watermelon | Present invention | 90% |
| | Comparison | 90% |
| Melon (prince) | Present invention | 65% |
| | Comparison | 60% |

As is mentioned above, the present invention reduces considerable labor and use of apparatus inherent in the course of gathering, transporting, drying, crushing, sieving, and sterilizing of soil according to the conventional method using the diluvial soil and offers a urea resin foam mat having an improved water absorbability which has been a defect of the conventional mat for raising seedling. The urea resin foam mat of the present invention is of industrially high value, because it is light, easily available in large quantities and has favourable properties as labor-saving artificial cultivation soil and can thus contribute to the increase of food production.

What is claimed is:

1. Urea resin foam mat which contains water absorbable and non-phytotoxic amounts of alkylene glycols and inorganic salts.

2. Urea resin foam mat of claim 1, in which said alkylene glycol is selected from the group consisting of ethylene glycol, triethylene glycol, polyethylene glycol or polypropylene glycol.

3. Urea resin foam mat of claim 1, containing 0.1~50 g of alkylene glycols per 580 mm×280 mm×18 mm.

4. Urea resin foam mat of claim 1, in which said inorganic salt is selected from a member consisting of hydrochloride, nitrate, sulfate, carbonate, phosphate, or hydroxide of alkali metal, alkali earth metal, and ammonium.

5. Urea resin foam mat of claim 1, in which said inorganic salt is selected from the group consisting of ammonium chloride, ammonium nitrate, ammonium sulfate, ammonium hydroxide, ammonium carbonate, ammonium primary phosphate, ammonium secondary phosphate, potassium chlorate, potassium nitrate, potassium sulfate, sodium hydrogenphosphate, calcium hydrogenphosphate and calcium monohydrogenphosphate.

6. Urea resin foam mat of claim 1, which contain 0.01~100 g of inorganic acids per 580 mm×280 mm×18 mm.

* * * * *